United States Patent [19]

Shetler et al.

[11] Patent Number: 4,488,455
[45] Date of Patent: Dec. 18, 1984

[54] ELECTRONIC SHIFTING AND IGNITION CONTROL SYSTEM FOR MOTORCYCLES

[75] Inventors: Robert L. Shetler, R.D. #1, Box 78, Shelby, Ohio 44875; Robert Merritt, Laguna Hills; Torsak Sethanant, Garden Grove, both of Calif.

[73] Assignee: Robert L. Shetler, Shelby, Ohio

[21] Appl. No.: 298,509

[22] Filed: Sep. 2, 1981

[51] Int. Cl.³ .............................................. B60K 41/08
[52] U.S. Cl. ...................................................... 74/851
[58] Field of Search ................. 74/851, 852, 843, 878; 123/198 B, 198 C, 198 D

[56] References Cited

U.S. PATENT DOCUMENTS

| | | | |
|---|---|---|---|
| 2,231,876 | 2/1941 | Beltz | 74/472 |
| 2,247,164 | 6/1941 | Butzbach | 74/472 |
| 2,387,891 | 10/1945 | Elkin | 74/472 |
| 2,519,080 | 8/1950 | Simpson | 192/0.08 |
| 2,741,350 | 4/1956 | Dodge | 192/0.092 |
| 3,481,223 | 12/1969 | Fraser | 74/851 |
| 3,792,630 | 2/1974 | Hause | 74/851 X |
| 4,215,596 | 8/1980 | Long | 74/851 |
| 4,270,414 | 6/1981 | Tellert | 74/852 |
| 4,355,549 | 10/1982 | Reinhard et al. | 74/878 X |

FOREIGN PATENT DOCUMENTS

| | | | |
|---|---|---|---|
| 2742809 | 4/1979 | Fed. Rep. of Germany . | |
| 2941556 | 4/1981 | Fed. Rep. of Germany | 74/851 |
| 1051103 | 1/1954 | France . | |
| 1338647 | 10/1962 | France | 74/851 |
| 1053049 | 12/1966 | United Kingdom | 74/851 |
| 1360596 | 7/1974 | United Kingdom | 74/851 |

OTHER PUBLICATIONS

"Looks Like a Street Bike", *Cycle World Magazine*, Apr. 1981, pp. 68, 69, 73, 74.

*Primary Examiner*—Allan D. Herrmann
*Assistant Examiner*—Stephen B. Andrews
*Attorney, Agent, or Firm*—Body, Vickers & Daniels

[57] ABSTRACT

A circuit and mechanism employing Hall effect devices as sensors disables and enables the ignition of a motorcycle in response to changing position of a shift lever. The ignition circuit is disabled at the start of shift lever transit and enabled as soon as travel on the lever completes a shift. A side stand position sensor and interlock is also included.

10 Claims, 3 Drawing Figures

ELECTRONIC SHIFTING AND IGNITION CONTROL SYSTEM FOR MOTORCYCLES

BACKGROUND OF THE INVENTION

The present invention pertains to a control mechanism for the ignition system of an internal combustion engine and more particularly to a means for interrupting ignition current in a motorcycle engine during transmission shifts.

Motorcycle transmissions in general share several broad similarities from model to model and make to make. Almost all motorcycle transmissions are activated by a foot pedal, shifts being made by raising the foot pedal from its rest position to its uppermost position and allowing it to return to rest after the shift is completed. Downshifting is performed by depressing the pedal.

Motorcycle transmissions are almost universally constant mesh transmissions. In these transmissions the outside surfaces or teeth of the gears are always engaged and specific gear selections are engaged by dogs on the sides of gears and gear assemblies which are slid along the transmission shafts by yokes connected to a shifting drum. This shifting drum is turned through an activation mechanism by the movement of the shifting pedal.

In order to effect shifting, it is necessary to remove the mechanical load from the transmission. This is normally accomplished with a clutch mechanism which mechanically disconnects the engine from the transmission when the clutch handle is pulled thereby mechanically unloading the transmission.

Attempts have been made in the past to improve on the shifting mechanism by incorporating means to unload the transmission into the shifting mechanism itself. In these systems shifting is performed by simply moving the foot pedal without the need to operate the clutch lever. These systems employ electro-mechanical switches which interrupt current to the ignition circuit of the engine when the shifting mechanism is activated. With ignition current interrupted, the engine no longer applies torque to the transmission thereby unloading it, allowing shifting.

Systems of this type have long been applied to automotive applications. U.S. Pat. No. 2,231,876 to Belts; U.S. Pat. No. 2,247,164 to Butzbach; U.S. Pat. No. 2,387,891 to Elkin; U.S. Pat. No. 2,519,080 to Simpson; U.S. Pat. No. 2,741,350 to Dodge; French Patent No. 1,051,103 and German Patent No. 27 42 809 all describe such systems. Also, U.S. Pat. No. 3,481,223 to Fraser describes such a system specifically applied to a motorcycle transmission. In Fraser an electrical switch has a plunger which is actuated by a lever arm riding on a cam surface attached to the shifting drum of a motorcycle transmission. The cam has depressions corresponding to the various gear positions and raised surfaces elsewhere. When the shift drum is moved during a shifting operation the roller is raised activating the switch and interrupting ignition current. The system described requires installation within the transmission case of the motorcycle and once so installed is difficult to adjust. Further, only a single switch is used to determine the start and finish of a shift. Precise adjustment of both shift start and shift finish can be critical in minimizing un-powered time in racing.

SUMMARY OF THE INVENTION

The present invention contemplates a new and improved system for unloading a transmission for shifting which is easily adjusted to provide the proper unloading interval, easily installed, provides for safety features not heretofore available and is rugged and economical.

In accordance with the present invention there is provided a system having sensors sensing the progress of a shift, electronic logic circuitry for interpreting this information and means responsive to the logic circuitry interrupting the ignition circuit of the motorcycle engine during the time necessary for accomplishing the shift.

In accordance with a more limited aspect of the invention, a system is provided comprised of: sensors for sensing shift lever travel past two selected positions, logic means using this positional information to determine when the shift lever or pedal movement is effecting a shift; and switch means responsive to the logic means disabling the ignition circuit during a shift.

In accordance with a more limited aspect of the invention, adjustable magnetic sensors are provided interacting with a magnet mechanically linked to said shift actuator allowing easy adjustment of the shift lever selected position.

Yet further in accordance with the invention a clutch switch is provided overriding the logic circuitry and allowing conventional shifts without ignition circuit interruption.

Still further in accordance with the invention a side stand switch and neutral sensor is provided interrupting ignition current should the motorcycle be shifted into gear with the side stand down.

The principal object of the invention is to provide an easily installed and maintained yet highly adjustable system to facilitate the shifting of an engine transmission without requiring the manual operation of a clutch mechanism.

Another object of the present invention is to provide an electronic shift mechanism which unloads the transmission for the absolute minimum amount of time required to make a shift.

Yet another object of the present invention is to provide an electronic shift control mechanism requiring a minimum of modification of existing systems.

Still another object of the present invention is to provide an electronic shift control mechanism which can be mounted entirely outside the transmission housing.

Still another object of the present invention is to provide an electronic shift control system which can be automatically overriden by operation of the clutch handle to make conventional shifts.

Yet another object of the present invention is to provide a system which will allow the starting of the motorcycle in neutral with the side stand down but will disable the motorcycle should it be shifted into gear with the side stand down.

The invention may take physical form in certain parts and arrangements of parts, a preferred embodiment of which will be described in detail in the specification and illustrated in the accompanying drawings which form a part hereof and wherein.

PREFERRED EMBODIMENT

Figure 1:
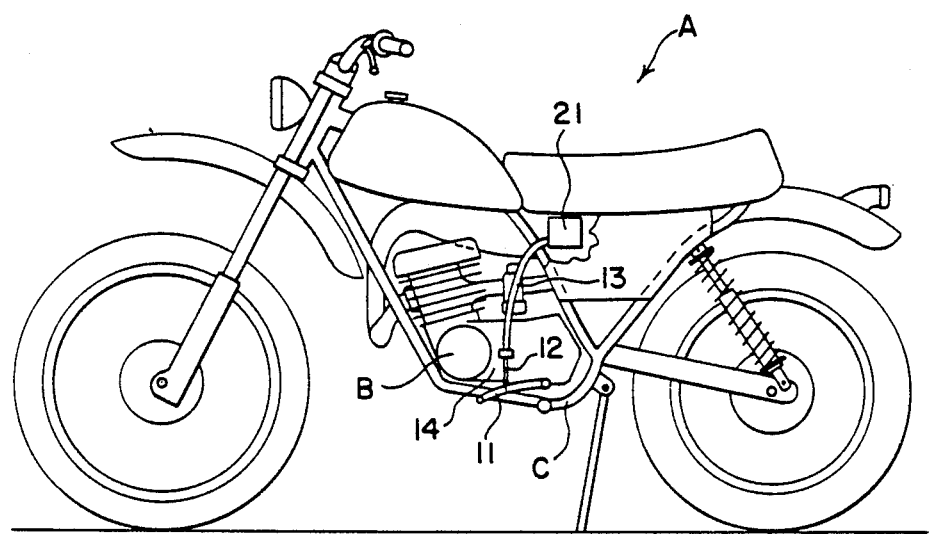
FIG. 1 is a side view of a motorcycle showing the installation of the present invention.

Referring now to the drawings wherein the showings are for the purposes of illustrating the preferred embodiment of the invention and not for the purpose of limiting same, the figures show a motorcycle A having an engine-transmission assembly B, supported on a frame C. A shift lever or pedal 11 is exposed on the lower portion of the transmission. A mechanical cable 12 in a jacket 13 is fixed to the transmission side cover 14 and the shift lever or pedal 11. The cable is moved within the jacket whenever the shift lever or pedal 11 is moved. The positioning of cable 12 and jacket 13 with respect to pedal 11 will vary from motorcycle to motorcycle. This can be easily accomplished and the sensors, to be described later, adjusted accordingly.

Mechanical cable jacket 13 is fixed at its other end to housing 21 which is in turn fixed to the frame C. The interior of housing 21 can best be seen in FIG. 2. Clamp 22 securely holds mechanical cable jacket 13 in place. Cable 12 exits cable jacket 13 and is fixed to a magnet 23 disposed in a track 24. Two Hall effect switches, such as those sold by Sprague Electric Company under Part No. UGS 3020 T, are identified as low switch 26 and high switch 27. Both switches are mounted on movable blocks 28, 29 alongside track 24. These switches are normally open and close when the magnet 23 enters a prescribed proximity to the switch.

Blocks 28 and 29 are movable along track 24 and can be fixed in any desired location. This allows the adjustment of the low switch and high switch so that they will close at first and second preselected positions along the magnet path. In practice, blocks 28 and 29 are adjusted such that engine ignition current is interrupted for the shortest possible period necessary to effect a shift. This is done by adjusting block 28 such that low switch 26 is actuated just prior to when shift pedal travel starts to move a transmission gear by moving the shifting drum. At that time transmission unloading is first required. Block 29 is adjusted such that switch 27 will be actuated when shift pedal travel is sufficient to complete a shift. In many instances this is prior to complete travel of the pedal 11.

Figure 2:
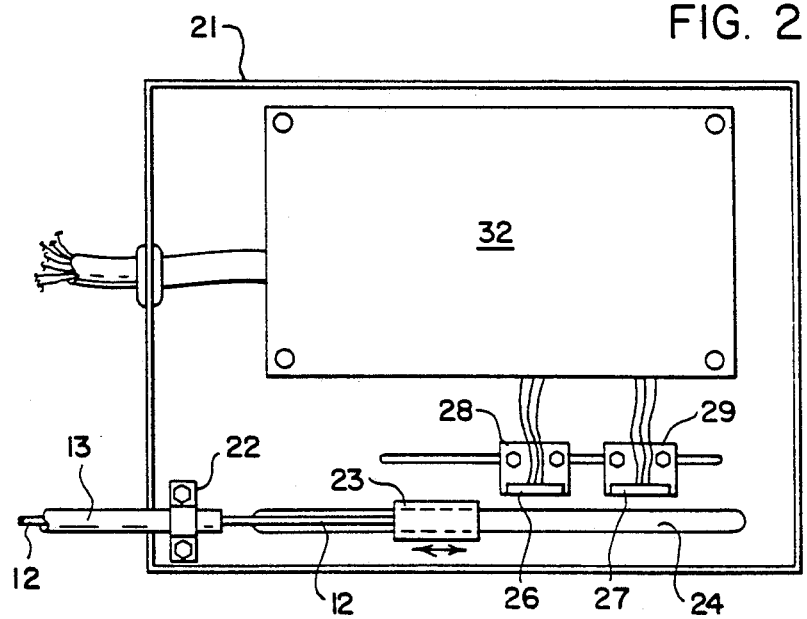
FIG. 2 is a plan view of the Hall effect sensor arrangement and circuit board used in the present invention; and, FIG. 3 is a schematic diagram of the circuitry used in the present invention.
Figure 3:
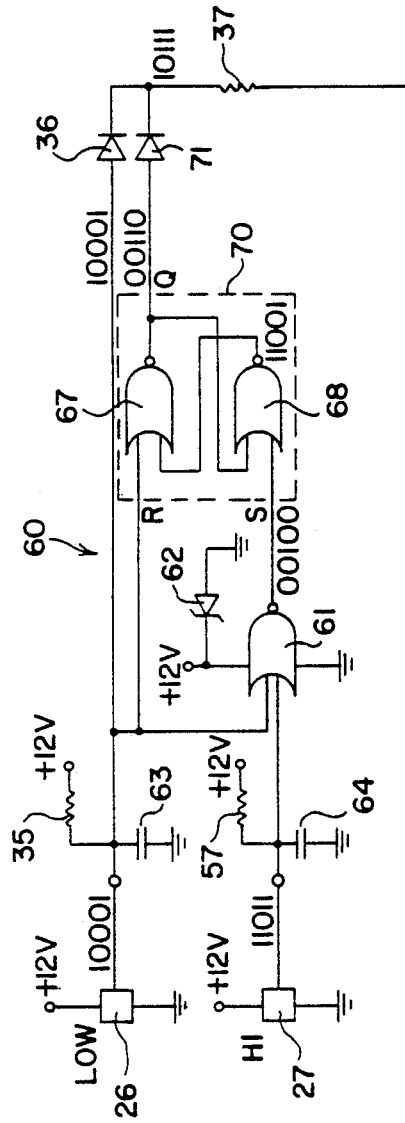
Figure 3:
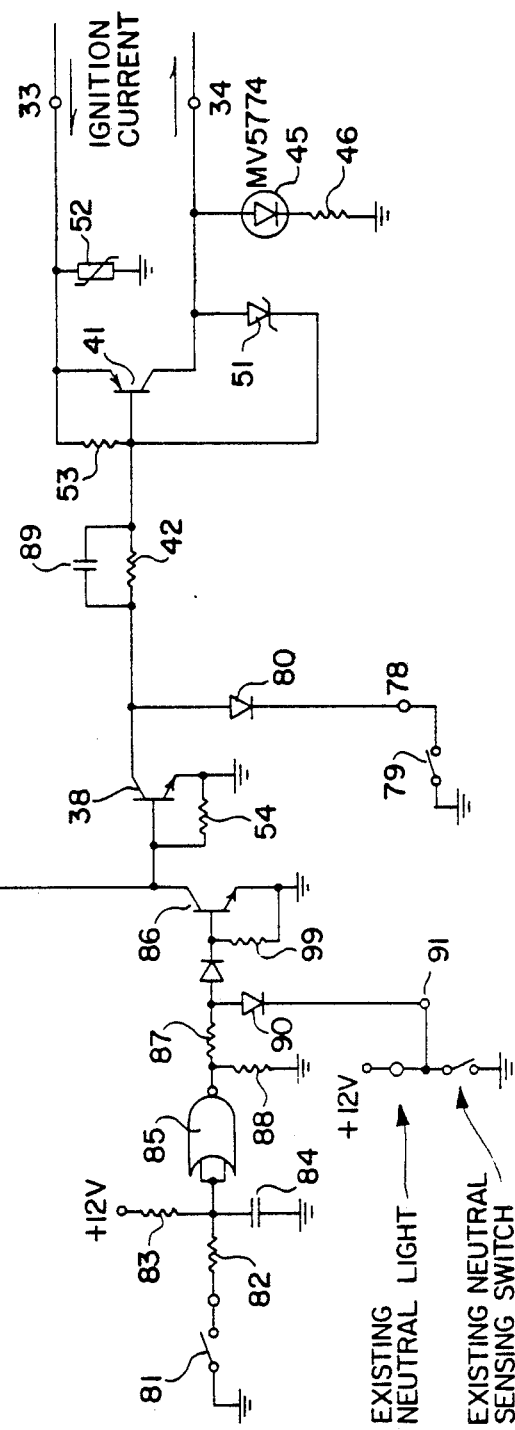

FIG. 3 is a schematic diagram of the circuit elements disposed on circuit board 32 shown in FIG. 2. Hall effect switches 26, 27 and other off-board sensors and switches are also shown in FIG. 3 for clarity and completeness. The circuit board is supplied with power from the motorcycle electrical circuit which is normally a 12 volt system. Other connections required include a ground connection, an interruption of the ignition circuit connected to the circuit board at two points, 33, 34, a connection to the existing transmission neutral sensor, a connection to a clutch switch and a side stand sensor switch. All of these connections can be made external of the engine compartment without difficulty.

The circuit shown in FIG. 3 will first be explained in its normal configuration with the motorcycle engine running and no shift taking place. In this condition, magnet 23 is in its rest position and both Hall effect switches 26 and 27 are unaffected. The output of low switch 26 is "high" or logical 1 and current will be supplied from the 12 volt source through the internal pull-up resistor of Hall effect switch 26, diode 36 and resistor 37 to the base of transistor 38. Resistor 35 is added to provide a pull-up in the event of Hall effect switch failure or disconnection of the switch sub-assembly. This forward biases transistor 38 turning it on. Base current is allowed to flow from transistor 41 through resistor 42 and transistor 38 to ground. Transistor 41 is turned on allowing motorcycle ignition current to flow between points 33 and 34 enabling the motorcycle engine. With transistor 41 turned on, the circuit has no effect on the engine ignition circuit and the motorcycle runs normally. Light emitting diode 45 glows in this condition as current passes from the ignition to the diode and resistor 46.

In the state just described both Hall effect switch 26 and Hall effect switch 27 are in the high or 1 state. Pull-up resistor 57 acts in the same manner as pull-up resistor 35.

The outputs of both Hall effect switches 26 and 27 are applied to the inputs of NOR gate 61.

NOR gates 67 and 68 are interconnected to form a R-S flip flop. The output of this flip flop is labeled Q and the two inputs are labeled R and S. The output Q will be "high" or 1 if the last input received was a high pulse on the S input and the output Q will be low or logical "0" if the last input received was a high pulse on the R input. When both inputs are low, the flip flop output Q will remain in the same state achieved when the last input pulse was received. The output of low Hall effect switch 26 is connected to R and to NOR gate 61. NOR gate 61 can only be high if Hall effect switch 26 is low and thus prevents both flip flop inputs from being high at the same time which would lead to ambiguities in the logic.

In the initial state, with the motorcycle engine running, output Q is low or "0" and diode 71 is reverse biased. When a shift is initiated shift lever or pedal 11 is raised moving magnet 23 into proximity with low Hall effect switch 26, grounding the switch. Diode 36 will be reverse biased and the biasing current formerly flowing through resistor 37 to transistor 38 will be cut off. Resistor 54 will pull the base to the emitter potential on transistor 38, and transistor 38 will turn off, isolating the base of transistor 41. Resistor 53 will pull the base of transistor 41 up to emitter potential, turning off the transistor. The ignition current in the motorcycle will be interrupted at points 33, 34 and the transmission unloaded.

With the transmission unloaded, the gears may be easily and quickly shifted by the action of the shift lever or pedal 11. As shift lever or pedal 11 travel continues, magnet 23 will be brought into proximity with high Hall effect switch 27, grounding it. The position of high Hall effect switch 27 has been adjusted such that this occurs the instant a shifting movement is complete and the gears are properly engaged. With both low Hall effect switch 26 and high Hall effect switch 27 grounded, NOR gate 61 will have a high output and trigger the S input of flip flop 70. This will shift the output Q to high or 1 state, forward biasing diode 71 and applying forward bias current to the base of transistor 38 through resistor 37. Transistor 38 will turn on, which will turn on transistor 41 shorting point 33 to point 34, enabling the ignition of the motorcycle. The motorcycle is again running normally.

The flip flop 70 remembers or latches the event of shift completion. If the shift lever or pedal 11 is maintained in the raised shifting position, the ignition will remain enabled. Also the ignition circuit will remain enabled as the shift pedal returns to its normal position.

As the shift lever or pedal 11 is returned to its initial position, magnet 23 will be removed from proximity with high Hall effect switch 27 allowing its output to go high. This will return the output of NOR gate 61 to low or "0" but will have no effect on the rest of the circuit. As the magnet moves further and is removed from proximity with low Hall effect switch 26, switch 26 output will also go high, forward biasing diode 36 and triggering the R input of flip flop 70 driving the Q output to "0", its initial state. The circuitry is ready for another shift cycle.

A clutch input point 78 is provided for connection to a clutch switch 79. Should the rider wish to use his clutch instead of the present invention he need merely pull his clutch handle thereby closing the clutch switch and forward biasing diode 80 supplying base current to transistor 41 and enabling the ignition circuit regardless of the state of the remainder of the circuit.

Provisions are also made for a side stand safety switch 81 which will be grounded when the side stand on the motorcycle is down. This will drain current through resistor 82 from resistor 83 and capacitor 84 applying a low input to NOR gat 85. The output of NOR gate 85 will be high forward biasing transistor 86 which will in turn ground the base of transistor 38 turning off transistor 41, disabling the ignition system. A rider will not be able to run the motorcycle until the side stand is in the up position opening switch 81 which will cause the output of NOR gate 85 to go to zero turning off transistor 86 and allowing transistor 38 to be forward biased.

A neutral sensor operates with the side stand switch to allow the operator to start his motorcycle with the side stand down. To allow safe starting of the engine, motorcycles generally have a neutral sensing circuit consisting of a neutral sensing switch in the transmission which closes when the transmission is in the neutral position. This neutral sensing switch connects one terminal of a neutral indicator light to ground when closed. The other terminal of the neutral indicator light is connected to positive battery potential when the motorcycle is turned on. The neutral indicator light glows when the transmission is in neutral indicating the motorcycle can be safely started. Diode 90 connects the base of transistor 86 through input point 91 to the existing neutral light circuit. When the motorcycle transmission is in neutral, this light will be on. Point 91 will sense low voltage, forward biasing diode 90. This will turn off transistor 86 regardless of the state of kick stand switch 81, allowing the motorcycle to be started. Should the user shift from neutral with the side stand down, the engine will cease operating.

Zener diode 51 and Varistor 52 protect the base-collector and base-emitter junctions of transistor 41 from transients and spikes found in ignition circuits. Capacitor 89 increases the turn on speed of transistor 41.

The four NOR gates 61, 67, 68, 85 are contained in a single integrated circuit package available from numerous sources under the Part No. 74C02. Zener diode 62 protects this package from supply transients and capacitors 63, 64 filter the noise to the inputs of NOR gates 61, 67.

Preferred values for all circuit elements and designations of preferred models of transistors and other solid state devices are given below.

| Component Values | | | |
|---|---|---|---|
| Resistors | | Capacitors | |
| Reference Numeral | Value OHMS | Reference Numeral | Value Microfarads |
| 35 | 2.2k | 63 | 0.1 |
| 37 | 4.7k | 64 | 0.1 |
| 42 | 4.7k | 84 | 2.2 |
| 46 | 2.2k | 89 | 0.1 (50 Volt) |
| 53 | 33k | Transistors | |
| 54 | 10k | Reference Numeral | Part No. |
| 57 | 2.2k | | |
| 82 | 100k | 38 | 2N2222A |
| 83 | 620k | 41 | 2N6050 |
| 87 | 20k | 86 | 2N2222A |
| 88 | 10k | Zener Diodes | |
| 99 | 10k | Reference Numeral | Part No. |
| All Diodes | 1N4004 | | |
| Varistor 52 | | 51 | 1N4757 |
| General Electric No. 27ZA60 | | 62 | 1N4745 |

The above-described system can be easily installed on virtually any motorcycle by mounting a cable and jacket on the gear cover and shift lever of the motorcycle as described and mounting housing 21 containing all other components at any convenient location. This can be underneath the seat, attached to the frame near the fork or any place else where convenient. The electrical modifications required for the inputs to this device are minimal and easily performed. The adjustment of the Hall effect switch position is easily performed by moving blocks 28 and 29 and observing light emitting diode 45. Light emitting diode 45 will glow when the ignition system is enabled and go out as soon as the ignition system is disabled by the movement of magnet into sufficient proximity with switch 26. The block 28 can be adjusted to provide engine disable at the point of shift lever movement desired. As shift lever movement continues and high switch 27 is affected, light emitting diode 45 will again begin to glow. Block 29 can be adjusted to provide optimum timing for engine re-enable.

While the foregoing invention has been described with respect to a motorcycle ignition system and is most useful for controlling motorcycle shifting, especially in racing, it should be appreciated that the circuit is equally applicable to other areas where quick shifts are important such as automobile drag racing and the like. Any application requiring automatic unloading of a transmission for shifting could also use the above-described invention to advantage. Obviously modifications and alterations will occur to others upon the reading and understanding of this specification. It is our intention to include all such modifications and alterations insofar as they come within the scope of the appended claims or the equivalence thereof.

Having thus described the invention, the following is claimed:

1. An ignition disabling system for use with a power producing system comprising an internal combustion engine having an electrical ignition system and a multi-speed transmission having a mechanical shift actuator, said ignition disabling system comprising: a first position sensor having a high output and a low output sensing travel of said shift actuator and changing state at a first selected actuator position; a second position sensor having a high output and a low output sensing travel of said shift actuator and changing state at a second selector actuator position; logic means receiving said first sensor output and said second sensor output and producing a logic output dependant on said first sensor output and said second sensor output; and, switch means responsive to said logic output, said switch means interrupting or passing ignition system current, whereby ignition system current is interrupted during the interval of actuator travel from said first selected actuator position to said second selected actuator position.

2. The system of claim 1 wherein said logic means includes latch means activated when said shift actuator reaches said second selected position and remaining activated until said shift actuator returns to below said first selected position whereby said ignition current is interrupted only when said actuator travels first through said first selected actuator position toward said second selected actuator position.

3. The system of claim 2 wherein said first position sensor and said second position sensor are adjustable.

4. The system of claim 3 wherein said first position sensor and said second position sensor are magnetically activated switches and said actuator means is mechanically connected to a magnet positioned to interact with said first position sensor and said second position sensor.

5. The system of claim 4 wherein an indicator lamp is provided, said lamp being on when ignition system current is passed by said switch means and off when ignition system current is interrupted by said switch means.

6. A motorcycle ignition system disabling system for use with motorcycles having an internal combustion engine, an ignition system, a multispeed transmission having a mechanical shift actuator and a neutral position, a neutral indicator light, a clutch and a side stand; said ignition disabling system comprising an ignition system disabling switch having a disabling switch control terminal, said disabling switch interrupting ignition system current when said disabling switch control terminal is in a first state and passing ignition system current when said disabling switch control terminal is in a second state, a neutral indicator light sensor driving said disabling switch control terminal into said second state when said transmission is in neutral regardless of the state of other circuit inputs; and, a side stand position sensor driving said disabling switch control terminal into said first state when said side stand is down.

7. The motorcycle ignition system disabling system of claim 6 including shift sensing means driving said disabling switch control terminal into said first state during periods when said transmission is being shifted.

8. The motorcycle ignition system disabling system of claim 7 including a clutch switch, said clutch switch driving said disabling switch control terminal into said second state when said clutch is activated regardless of the state of other circuit inputs.

9. A motorcycle ignition system disabling system for use with motorcycles having an internal combustion engine, an ignition system, a multispeed transmission having a mechanical shift actuator and a neutral position, a neutral indicator light, a clutch and a side stand; said ignition disabling system comprising an ignition system disabling switch having a disabling switch control terminal, said disabling switch interrupting ignition system current when said disabling switch control terminal is unground; a clutch switch, said clutch switch grounding said control terminal when said clutch is activated; inverter switch means having an inverter switch control terminal, said inverter switch grounding said disabling switch control terminal when high voltage is applied to said inverter switch control terminal; a side stand switch having a low output when said side stand is in the down position; a neutral indicator light signal having a low value when said transmission is in said neutral position and a high value at all other times; a side stand switch-neutral indicator light signal circuit grounding said inverter switch control terminal when said side stand is in the down position and neutral indicator light signal has a high value; and, a shift sensing means applying high voltage to said inverter switch control terminal during period when said transmission is being shifted.

10. The motorcycle ignition system disabling system of claim 9 wherein said shift sensing means includes: a first shift actuator position sensor having a high output and a low output, said first position sensor sensing when said shift actuator passes a first selected position; a second shift actuator position sensor having a high output and a low output, said second position sensor sensing when said shift actuator passes a second selected position and latch means activated when said shift actuator passes said second selected position and remaining activated until said shift actuator returns to below said first selected position.

* * * * *